US012194750B2

(12) United States Patent
Yoda et al.

(10) Patent No.: US 12,194,750 B2
(45) Date of Patent: Jan. 14, 2025

(54) INK HEATING DEVICE, INK SUPPLY DEVICE AND IMAGE FORMING SYSTEM

(71) Applicant: KYOCERA Document Solutions Inc., Osaka (JP)

(72) Inventors: Junya Yoda, Osaka (JP); Tetsuya Ueno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 139 days.

(21) Appl. No.: 18/003,969

(22) PCT Filed: Jul. 1, 2021

(86) PCT No.: PCT/JP2021/024907
§ 371 (c)(1),
(2) Date: Dec. 30, 2022

(87) PCT Pub. No.: WO2022/009762
PCT Pub. Date: Jan. 13, 2022

(65) Prior Publication Data
US 2023/0256743 A1 Aug. 17, 2023

(30) Foreign Application Priority Data
Jul. 6, 2020 (JP) ................................ 2020-116597

(51) Int. Cl.
*B41J 2/175* (2006.01)

(52) U.S. Cl.
CPC .................................... *B41J 2/175* (2013.01)

(58) Field of Classification Search
CPC ........ B41J 2/175; B41J 2/195; B41J 2/17513; B41J 2/17566; B41J 29/00; B41J 2/17; B41J 2/01; B41J 2/04563; B41J 2/14088; B41J 29/38
See application file for complete search history.

(56) References Cited

U.S. PATENT DOCUMENTS

2006/0284914 A1* 12/2006 Murakami .............. B41J 2/175 347/17
2011/0123208 A1 5/2011 Inukai

FOREIGN PATENT DOCUMENTS

| | | | |
|---|---|---|---|
| EP | 1013451 | A2 | 6/2000 |
| JP | 2000-218820 | A | 8/2000 |
| JP | 2001-191539 | A | 7/2001 |
| JP | 2011-113807 | A | 6/2011 |
| JP | 2011-198485 | A | 10/2011 |
| JP | 2015-205418 | A | 11/2015 |

* cited by examiner

*Primary Examiner* — Jannelle M Lebron
(74) *Attorney, Agent, or Firm* — Studebaker & Brackett PC

(57) ABSTRACT

An ink heating device (7) includes a heater circuit (91) including a heater (71) which heats ink and an auto-return type bimetal switch (92) which is provided between the heater (71) and a power source (A); a relay (5) provided between the bimetal switch (92) and the power source (A); and a controller (4) which opens or closes the relay (5) according to a state of the heater circuit (91).

8 Claims, 10 Drawing Sheets

INK HEATING DEVICE, INK SUPPLY DEVICE AND IMAGE FORMING SYSTEM

TECHNICAL FIELD

The present invention relates to an ink heating device which heats ink supplied to an inkjet recording apparatus, an ink supply device provided with the ink heating device, and an image forming system provided with the ink supply device and the inkjet recording apparatus.

BACKGROUND

An inkjet recording apparatus includes an ink container which supplies ink to a recording head, but an ink supply device with a large-capacity ink container is offered as an option based on an assumption that a large amount of ink is consumed.

In order to obtain good image quality, the viscosity of the ink needs to be kept in the proper range, but the viscosity of the ink may increase due to low room temperature. Therefore, the ink supply device is provided with a means to heat the ink. As an example of the means to heat the ink, a heater unit including a tube and a heater is known. One end of the tube is connected to the large-capacity ink container, the other end is connected to the ink supply path of the inkjet recording apparatus, and the ink fed from the ink container is heated by the heater and supplied to the inkjet recording apparatus.

By the way, the image formation cannot be started until the ink is heated to a proper temperature, so there is a waiting time. Therefore, a system which rapidly heats the ink is provided in order to reduce the waiting time. However, the rapid heating uses a large current, which may cause overheating. Therefore, a technology to prevent the overheating have been studied.

For example, in Patent Document 1, it is proposed to include a first detection means and a second detection means. The first detection means detects that the heater control signal is off and the heater state signal is on for a period longer than the first set time. The second detection means detects abnormity when the heater control signal is off and the heater state signal is on again after the second set time after the detection by the first detection means. Then, the power to the heater is forcibly turned off based on the detection by the second detection means. In addition, Patent Document 2 proposes to detect whether the voltage change rate of the AC power source at zero-cross timing is greater than or equal to the allowable value, and to prohibit the power supply from the AC power supply to the heating means when the voltage change rate is greater than or equal to the allowable value.

Prior Art Documents

Patent Document

Patent Document 1: Japanese Patent Laid-Open No. 2001-191539
Patent Document 2: Japanese Patent Laid-Open No. 2011-113807

SUMMARY OF THE INVENTION

Problems to be Solved by Invention

However, in the configurations proposed in Patent Documents 1 and 2, the controller determines the abnormity of the device using the information output from the device, and stops the heating when it is determined to be abnormal. Therefore, there is a time difference between the occurrence of overheating and the stopping of heating, and the heating cannot be stopped immediately when overheating occurs.

The invention is to provide an ink heating device, an ink supply device, and an image forming system which can shorten the time from the occurrence of overheating to the stop of heating.

Means of Solving the Problems

An ink heating device according to the present invention includes: a heater circuit including a heater which heats ink and an auto-return type bimetal switch which is provided between the heater and a power source; a relay provided between the bimetal switch and the power source; and a controller which opens or closes the relay according to a state of the heater circuit.

An ink supply device according to the present invention includes an ink container for storing the ink, and the ink heating device according to claim 1, which heats the ink supplied from the ink container.

An image forming system according to the present invention includes the ink supply device and an inkjet recording device including a conveyance unit which conveys a sheet-like recording medium and an inkjet head which ejects the ink supplied from the ink supply device to the recording medium conveyed by the conveyance unit.

Effects of the Invention

According to the present invention, it becomes possible to shorten the time from the occurrence of overheating to the stop of heating.

EMBODIMENT FOR CARRYING OUT THE INVENTION

Hereinafter, with reference to the attached drawings, an image forming system 3 according to the embodiment of the present invention will be described.

Figure 1:
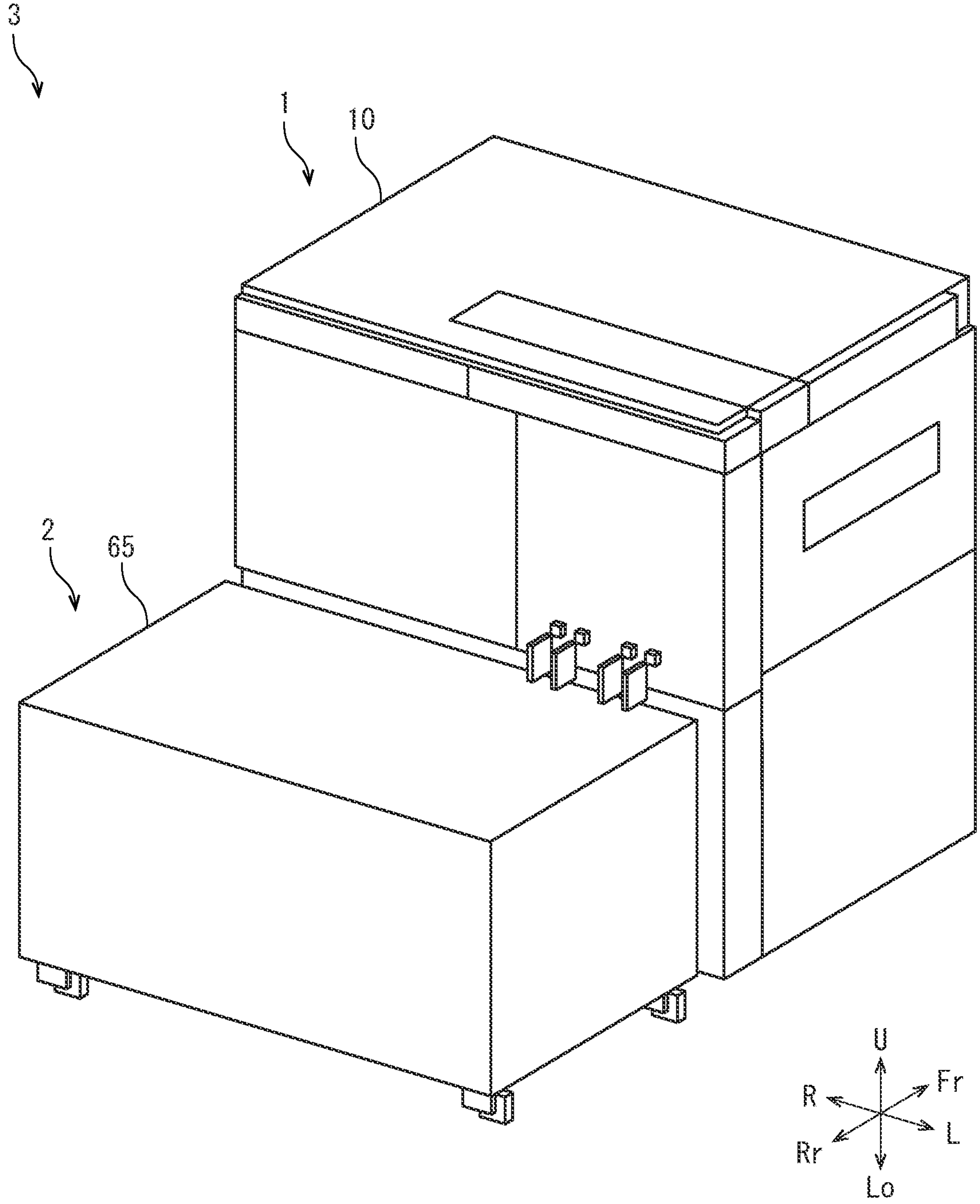
FIG. 1 is a perspective view showing an appearance of a printer and an ink supply device according to one embodiment of the present invention.
Figure 2:
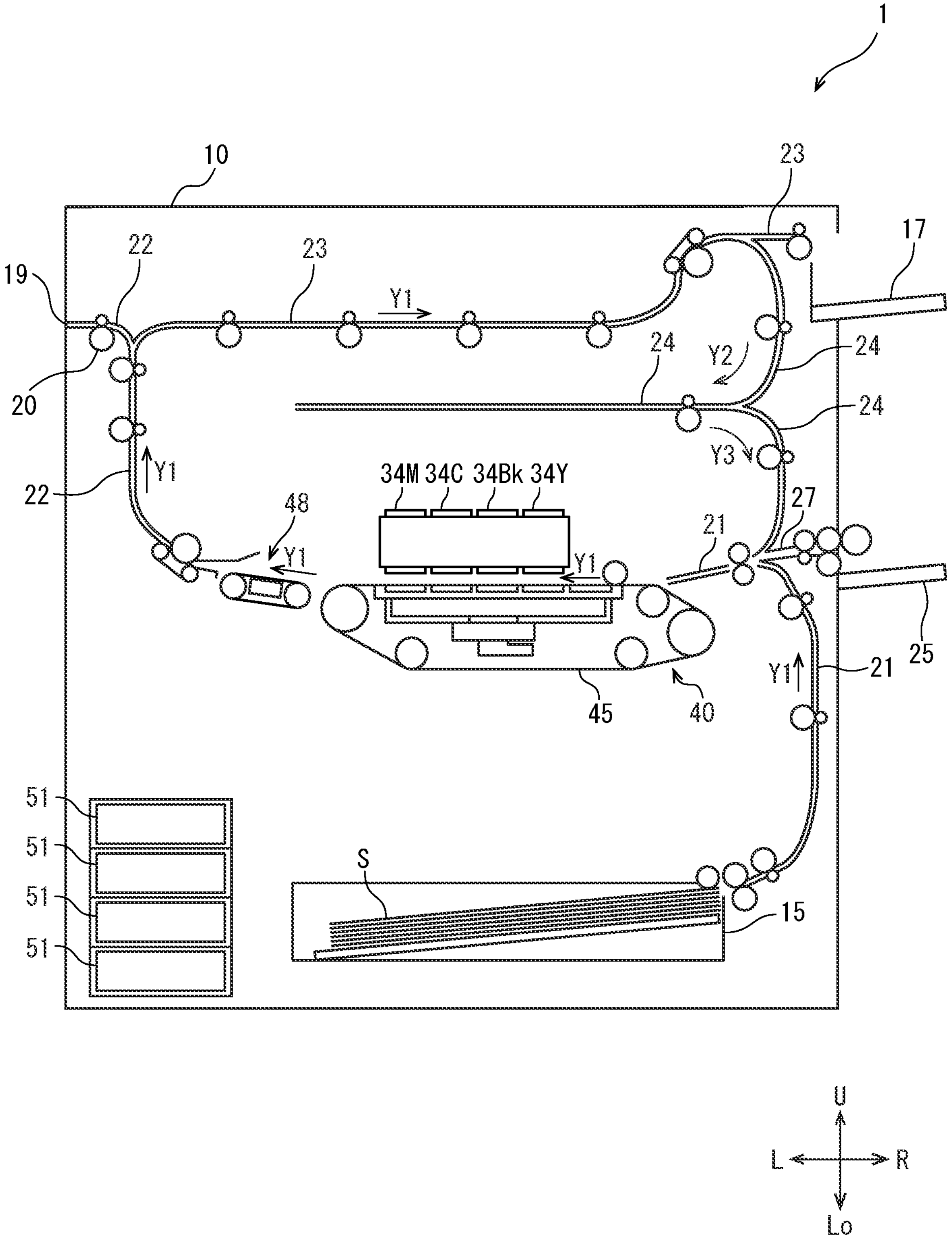
FIG. 2 is a front view schematically showing an internal structure of the printer according to the embodiment of the present invention.
Figure 3:
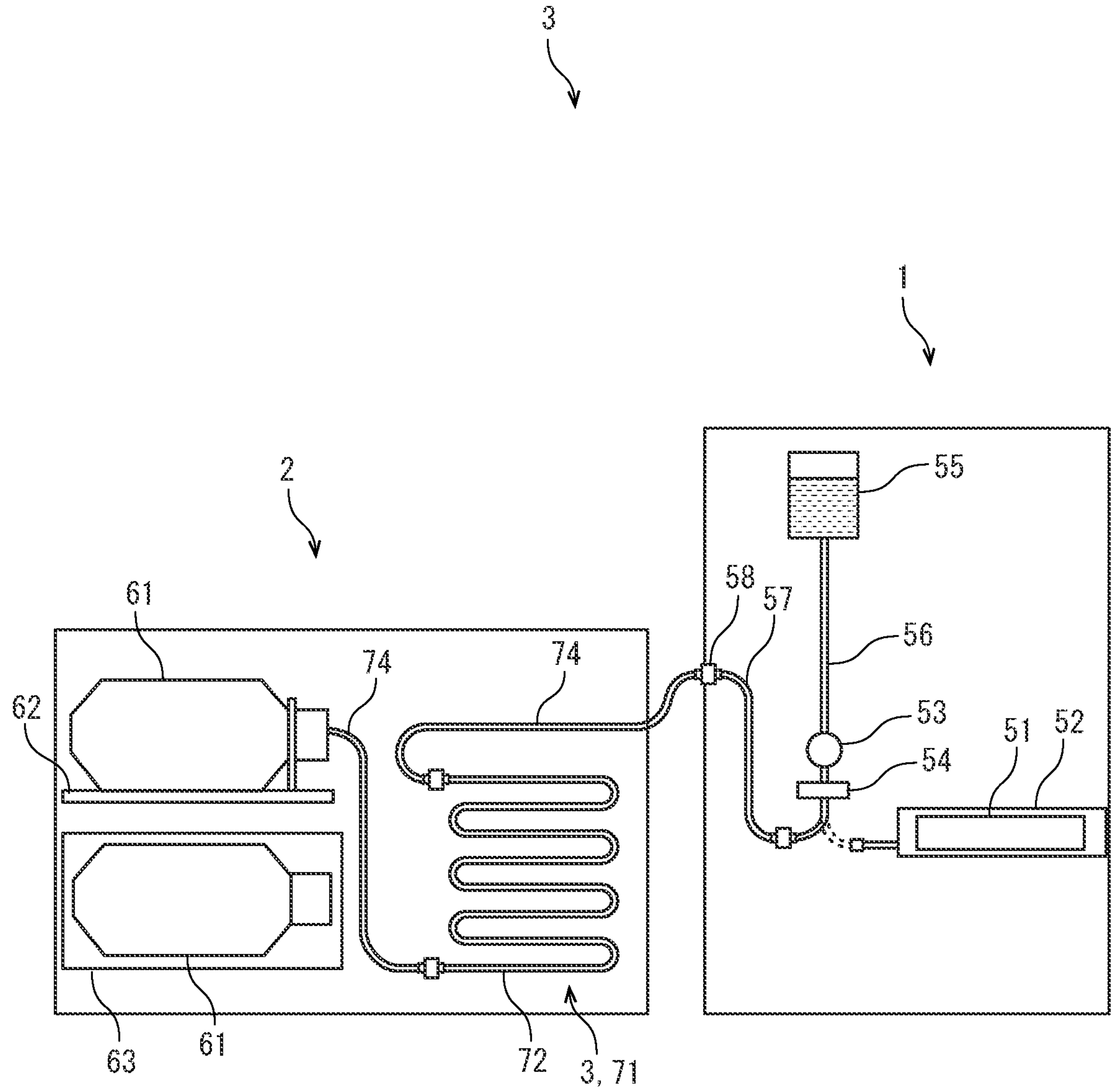
FIG. 3 is a view schematically showing a path for supplying ink, according to the embodiment of the present invention.

First, the overall configuration of the image forming system 3 will be described. The image forming system 3 includes an ink supply device 2 and a printer 1 (an example of an inkjet recording apparatus). FIG. 1 is a perspective view showing the appearance of the ink supply device 2 and the printer 1. FIG. 2 is a front view schematically showing the internal structure of the printer 1. FIG. 3 is a view schematically showing an ink supply path. Fr side in FIG. 1 (the front side of the paper plane on which FIG. 2 is drawn) is defined as the front side of the ink supply device 2 and the printer 1, and the left-and-right direction is described on the basis of the direction in which the ink supply device 2 and the printer 1 are viewed from the front side. In each figure, U, Lo, L, R, Fr and Rr indicate upper, lower, left, right, front and rear, respectively.

The printer 1 is an inkjet image forming device which forms an image by ejecting ink onto a sheet S (an example of a sheet-like recording medium) such as a plain paper and a coated paper. The ink supply device 2 is provided on the rear side of the printer 1 and supplies the ink to the printer 1.

The printer 1 includes a box-shaped body housing 10 in which various devices are housed. A drawable sheet feeding cassette 15 in which the sheet S is stored is provided in the lower portion of the inside of the body housing 10, and a manual sheet feeding tray 25 on which the sheet S is manually placed is provided on the right side surface of the body housing 10. Above the manual sheet feeding tray 25, a discharge tray 17 on which the image-formed sheet S is stacked is provided, and a discharge port 19 through which the sheet S is conveyed to a post-processing device (not shown) adjacent to the left side of the printer 1 is formed on the upper portion of the left side surface of the body housing 10.

In the center portion of the inside of the body housing 10, head units 34Y, 34Bk, 34C and 34M (collectively referred to as head units 34) each including one or more inkjet heads that eject the ink to the sheet S are provided, and eject the yellow, black, cyan and magenta ink, respectively. Below the head unit 34, a conveyance unit 40 which attracts the sheet S on which the image is to be formed to a conveyance belt 45 and conveys it is provided, and on the left side of the conveyance unit 40, a drying unit 48 which dries the image formed sheet S while conveying it is provided. Ink containers 51 filled with the inks are housed in the lower left portion of the inside of the body housing 10.

That is, the recording apparatus of this embodiment is a so-called line printer. As another embodiment, there is a so-called serial printer alternatively performing a scanning in which a carriage with an inkjet head is reciprocated with respect to a recording medium and a moving the recording medium in a direction intersecting the direction of scanning.

On the right side of the conveyance unit 40, a first conveyance path 21 from the sheet feeding cassette 15 to the conveyance unit 40, and a manual sheet feeding path 27 merging from the manual sheet feeding tray 25 to the first conveyance path 21 are provided. On the left side of the drying unit 48, a second conveyance path 22 from the drying unit 48 to the discharge port 19 is provided. Above the head unit 34, a third conveyance path 23 branching from the second conveyance path 22 to the discharge tray 17 and a fourth conveyance path 24 branching from the third conveyance path 23 to merge with the first conveyance path 21 are provided. At the branch point between the second conveyance path 22 and the third conveyance path 23, and at the branch point between the third conveyance path 23 and the fourth conveyance path 24, guide members for guiding the conveyance of the sheet S are provided (not shown).

Next, an overview of the image forming operation of the printer 1 will be described. When an image forming job is input to the printer 1, the sheet S is fed from the sheet feeding cassette 15 or the manual sheet feeding tray 25, and conveyed in the Y1 direction along the first conveyance path 21. The sheet S is attracted and conveyed by the conveyance belt 45 of the conveyance unit 40. Then, an image is formed on the sheet S by ejecting the ink droplets from the head unit 34 to the sheet S. The image-formed sheet S is conveyed by the drying unit 48, and drying of the ink is accelerated. The sheet S is conveyed along the second conveyance path 22 and the third conveyance path 23, and discharged to the discharge tray 17.

[Ink Supply Path] Next, an ink supply path is described. FIG. 3 shows a configuration corresponding to one color of ink, but since the four colors of ink are used in this embodiment, four similar configurations are provided. The printer 1 includes a container attachment part 52 to which the ink container 51 is attached, a pump 53 which sucks the ink from the ink container 51, a filter 54 which filters the ink sucked to the pump 53, a sub-tank 55 in which the ink fed from the pump 53 is stored, and a pump (not shown) which feeds the ink stored in the sub-tank 55 to the head unit 34. The ink container 51, the filter 54, the pump 53 and the sub-tank 55 are connected by a main tube 56. One end of a relay tube 57 is connected to a coupling 58 provided on the rear surface of the body housing 10 of the printer 1. When the ink supply device 2 is used, the upstream end of the main tube 56 is replaced by the other end of the relay tube 57 instead of the ink container 51.

Figure 4:
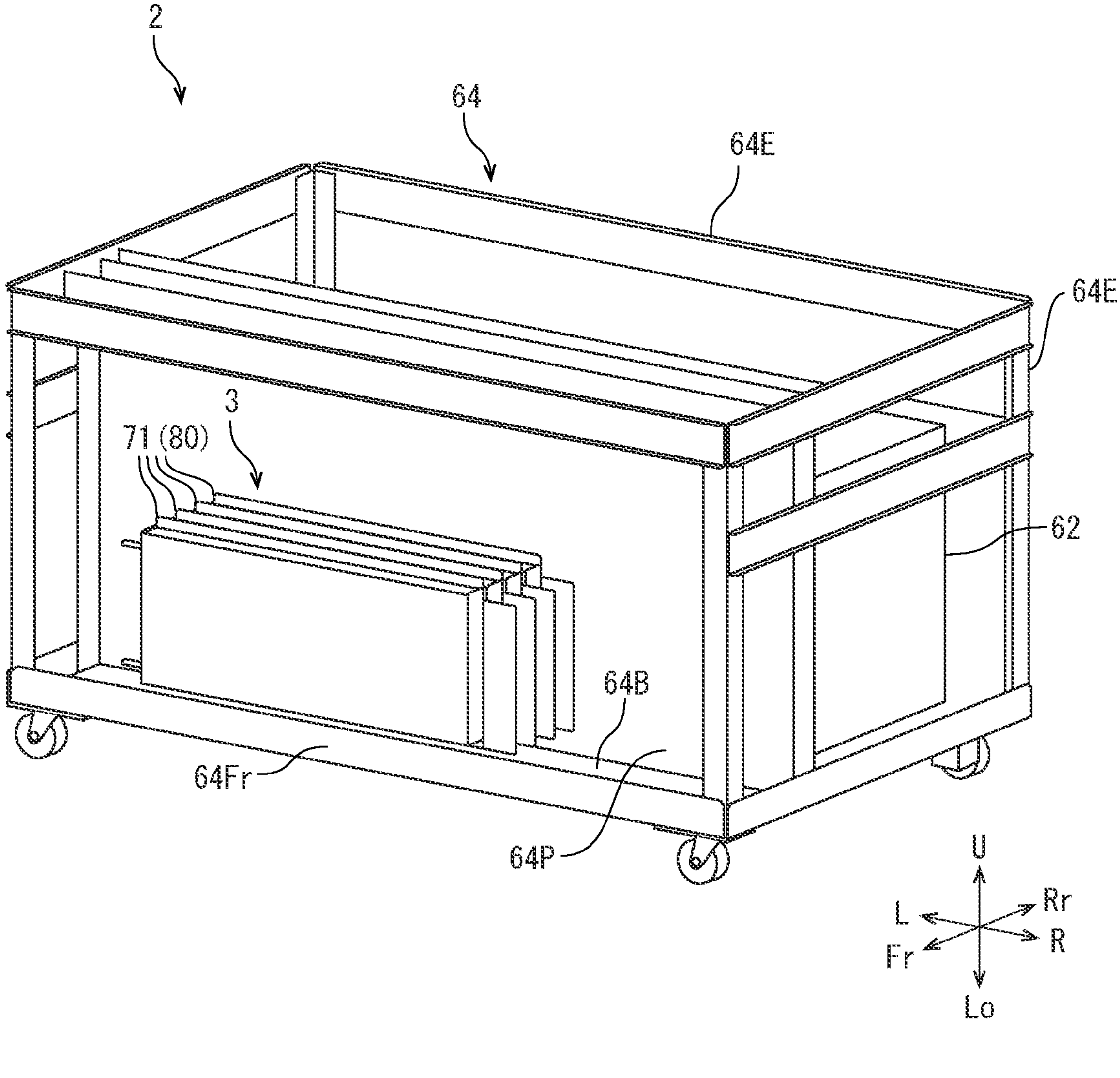
FIG. 4 is a perspective view showing an inside of the ink supply device according to the embodiment of the present invention.
Figure 5:
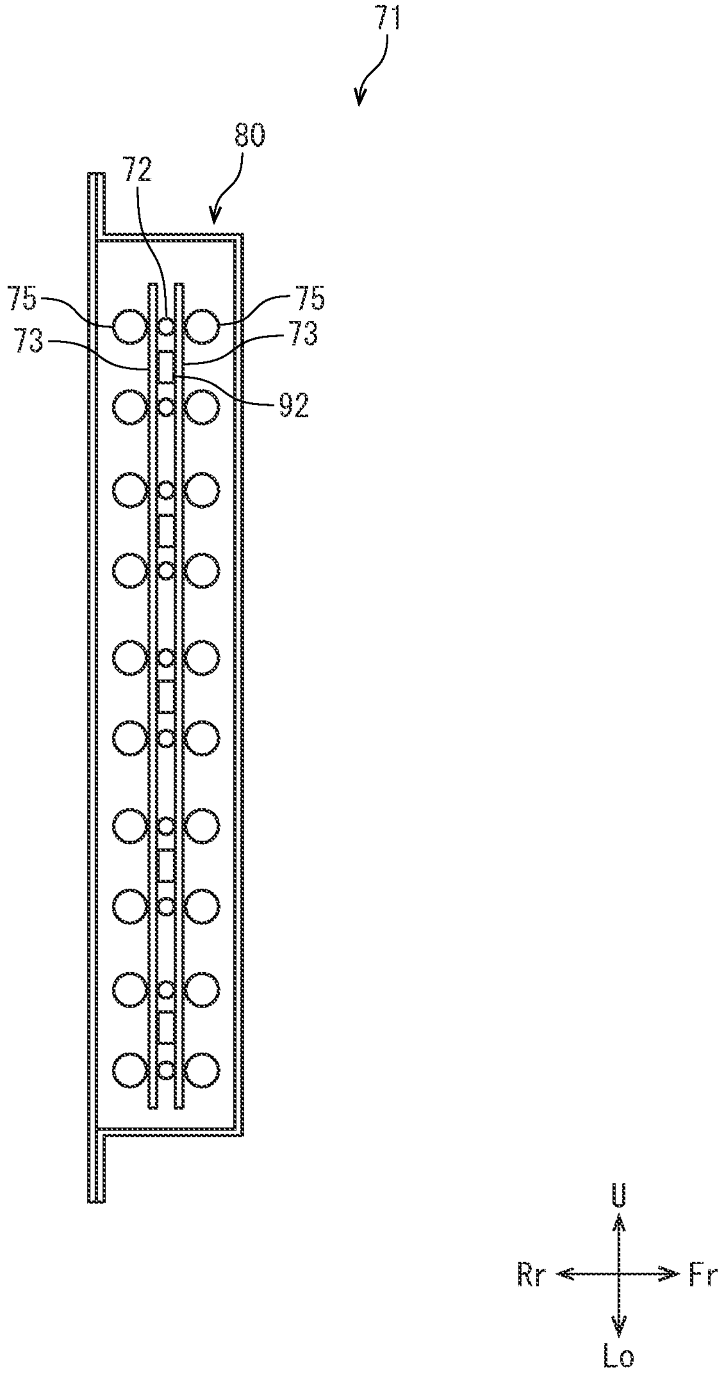
FIG. 5 is a view schematically showing a sectional surface of a heater unit according to the embodiment of the present invention.
Figure 6A:
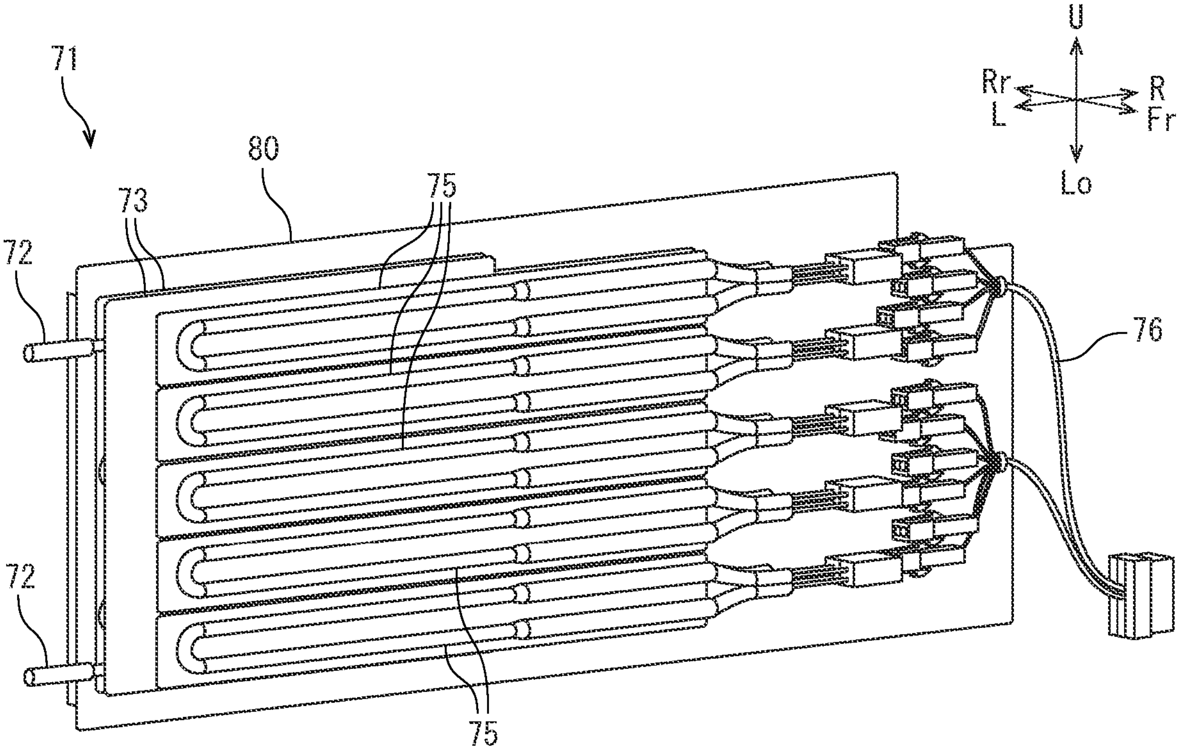
FIG. 6A is a perspective view showing a heater according to the embodiment of the present invention.
Figure 6B:
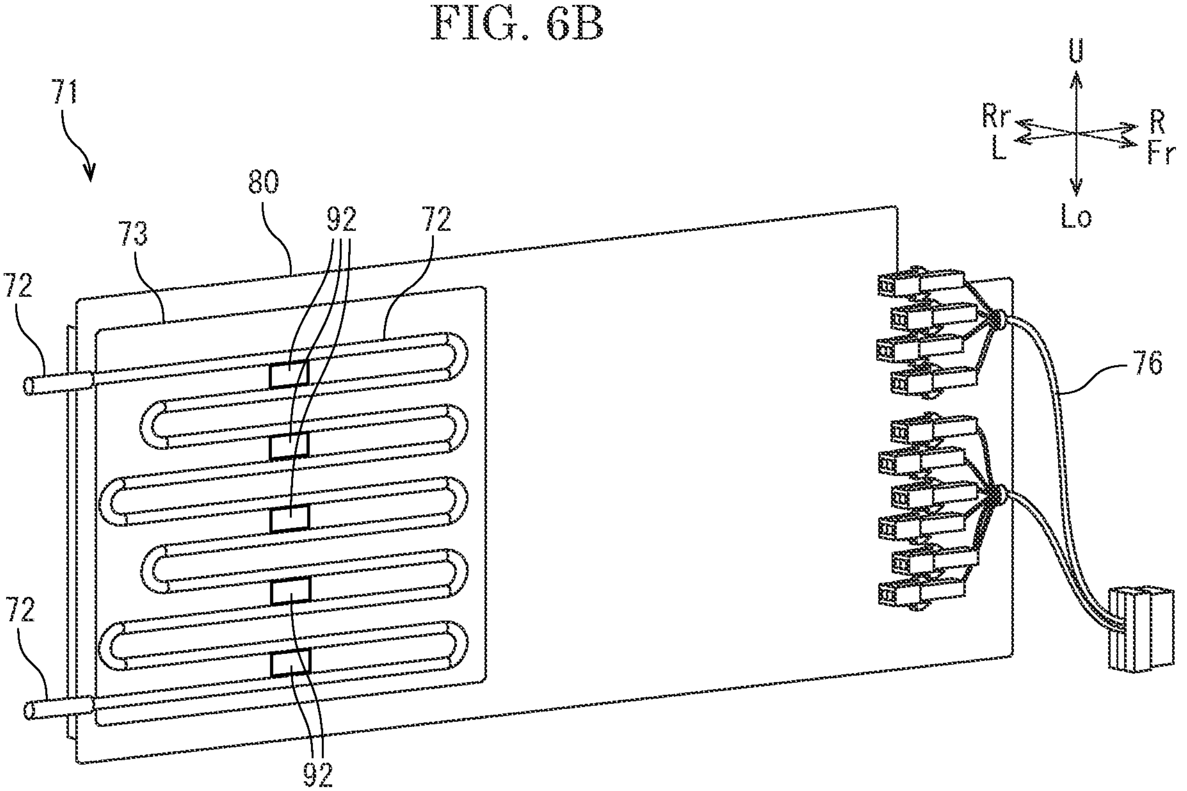
FIG. 6B is a perspective view showing a tube according to the embodiment of the present invention.

[Ink Supply Device] Next, the ink supply device 2 will be described. FIG. 4 is a perspective view showing the inside of the ink supply device 2. FIG. 5 is a view schematically showing a cross section of a heater unit 71. FIG. 6A is a perspective view showing a heater 75. FIG. 6B is a perspective view showing a tube 72.

The ink supply device 2 includes an ink container 61 in which the ink is stored and an ink heating device 7 which heats the ink fed from the ink container 61. The ink heating device 7 includes a heater circuit 91 including a heater 75 which heats the ink and an auto-return type bimetal switch 92 provided between the heater 75 and an AC power source A, a relay 5 provided between the bimetal switch 92 and the AC power source A, and a controller 4 which opens and closes the relay 5 according to the state of the heater circuit 91.

[Ink Container] The ink supply device 2 (see FIG. 4) includes a container attachment part 62 to which the ink container 61 is attached. The ink container 61 has a larger capacity than the ink container 51 attached to the inside of the printer 1. Since the four colors of ink are used in this embodiment, the four ink containers 61 are provided and filled with the yellow, black, cyan and magenta inks, respectively. A spare container storage part 63 in which the spare ink container 61 is stored may be provided.

[Heater Unit] One heater unit 71 is provided for each of the ink containers 61.

[Tube] A tube 72 (see FIG. 3 and FIG. 6B) is a tube made of stainless steel or the like, and is provided in a regularly meandering shape. The tube 72 is held in the front-and-rear direction by two support plates 73 made of aluminum or the like. One end of the tube 72 is connected to the ink container 61 by a relay tube 74. The other end of the tube 72 is connected to the coupling 58 of the printer 1 by the relay tube 74.

[Heater] The heater 75 (see FIG. 6A) is, for example, a cord heater in which an electric heating wire is coated with silicone resin, and is provided along the tube 72 on the front and rear sides of the tube 72 via the support plate 73. A power feed line 76 is connected to the heater 75. In the example of FIG. 6A, the total ten heaters 75 including the five heaters 75 on the front side of the tube 72 and the five heaters 75 on the rear side of the tube 72 are provided in parallel, but the number of heaters 75 may be one or more.

[Housing] A housing 80 (see FIG. 5) houses the heaters 75 and the tubes 72. The housing 80 is formed in a hollow plate shape whose dimension in the front-and-rear direction is smaller than those in the left-and-right direction and the upper-and-lower direction.

[Frame] A frame 64 (see FIG. 4) has a ridge part 64E forming a ridge of a cuboid, a bottom plate part 64B forming the bottom of the cuboid, and a partition wall part 64P dividing the internal space into a front space and a rear space, and the housing 65 is formed by attaching side plates and a top plate to the outside of the frame 64. The four heater units 71 are housed on the front side of the partition wall part 64P and the four ink containers 61 are housed on the rear side of the partition wall part 64P. The four heater units 71 are stacked side by side in the front-and-rear direction and fixed to the frame 64.

Figure 7:
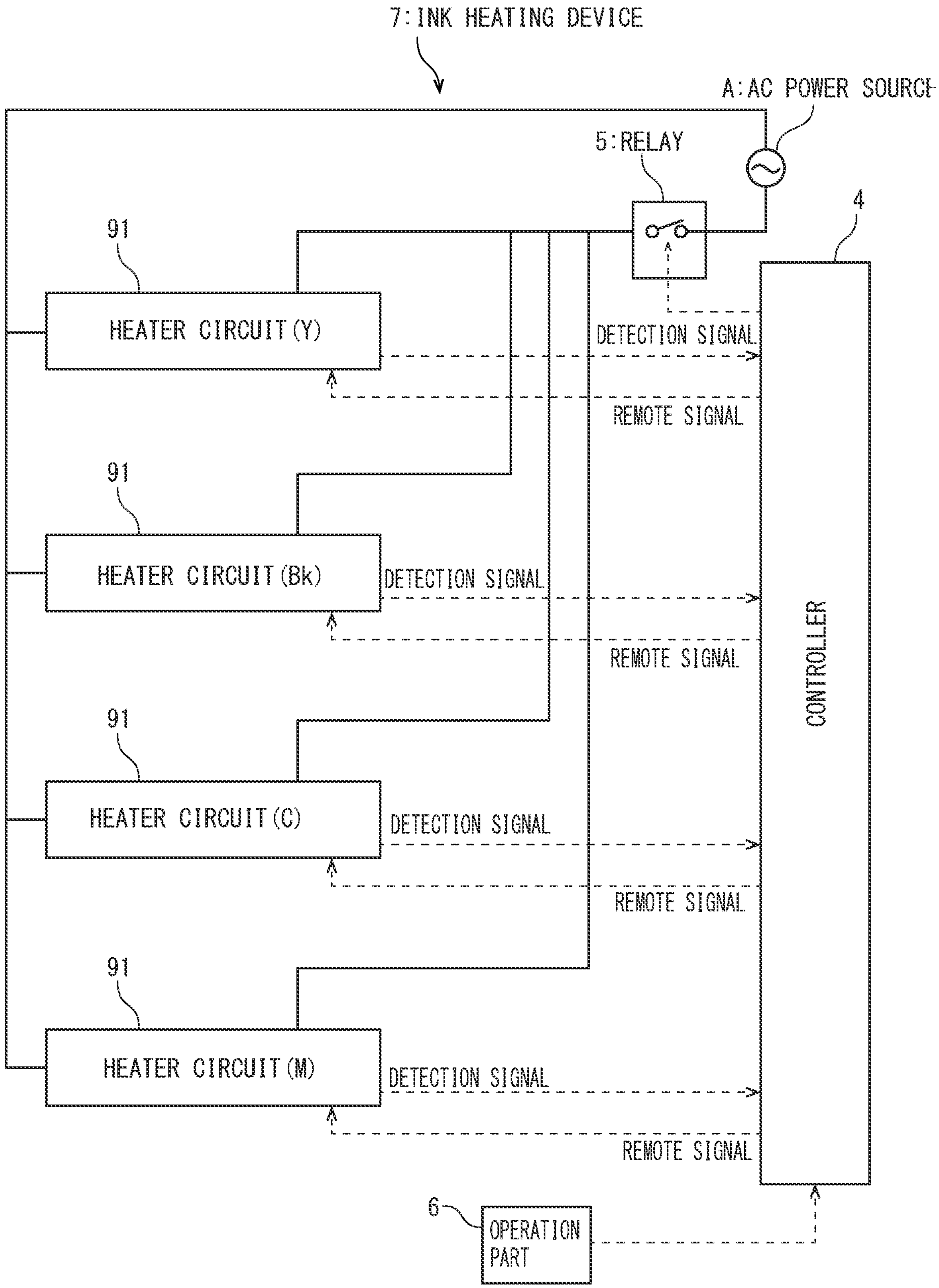
FIG. 7 is a circuit diagram of the ink heating device according to the embodiment of the present invention.
Figure 8:
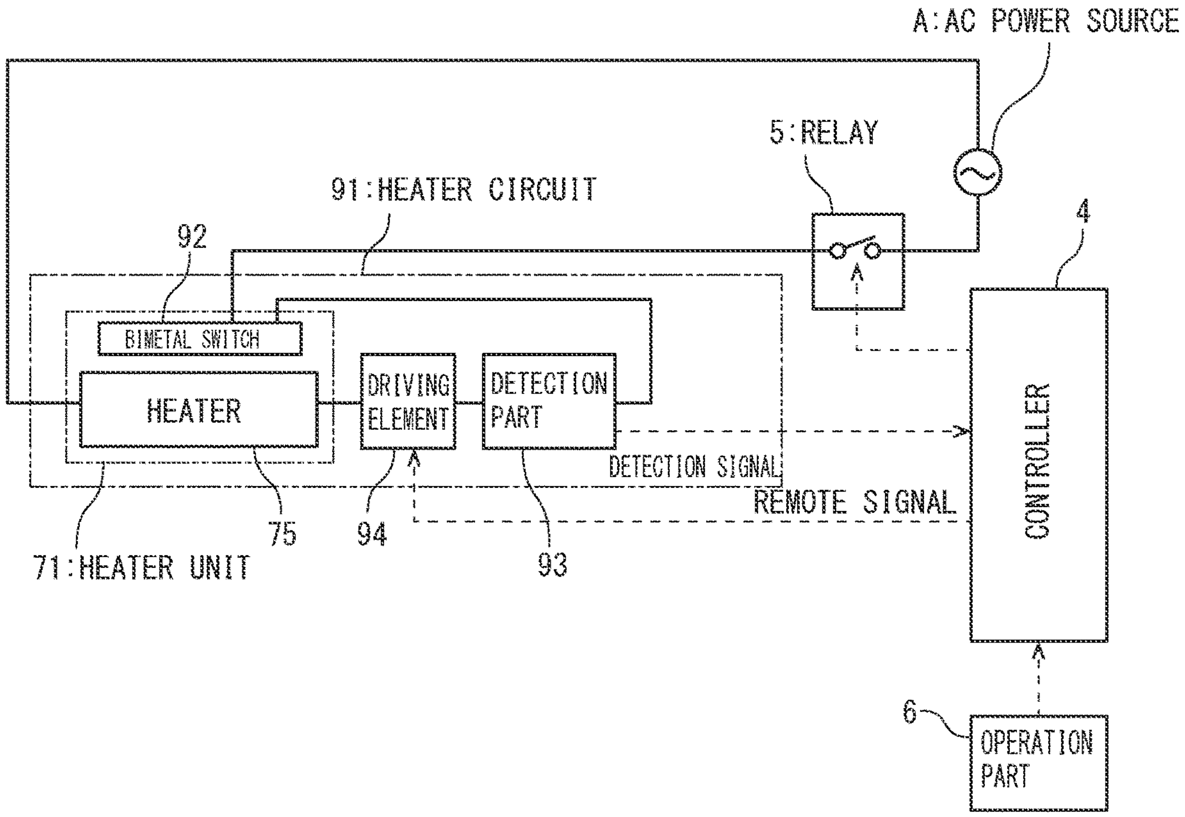
FIG. 8 is a circuit diagram showing a heater circuit according to the embodiment of the present invention.
Figure 9:
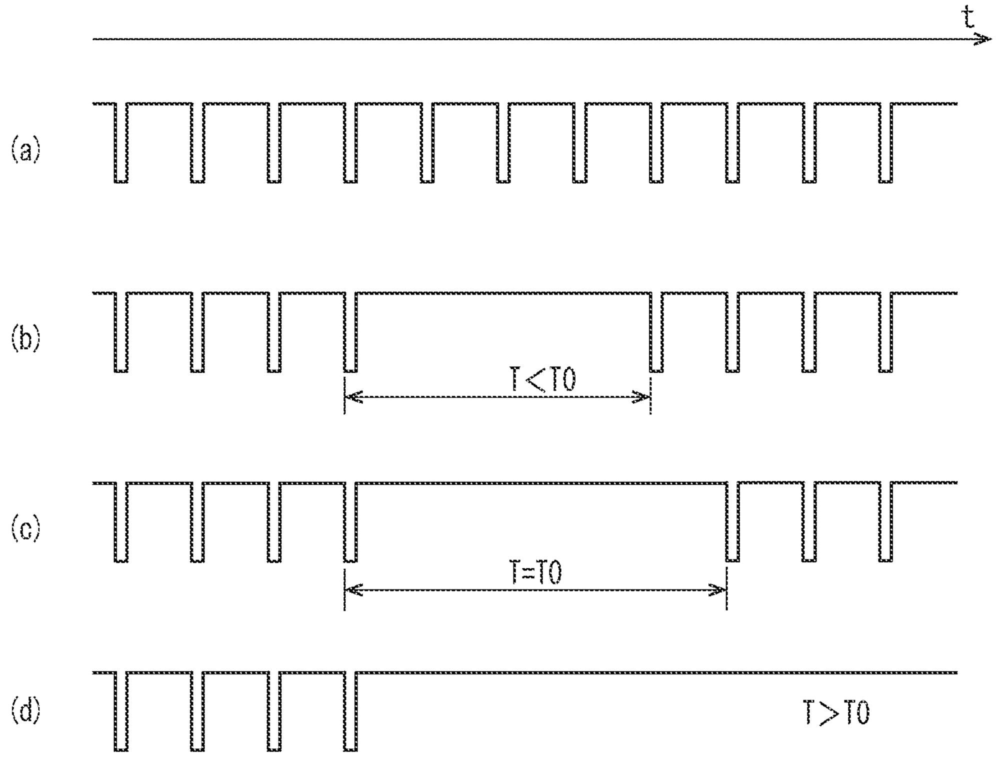
FIG. 9 is a timing chart of a detection signal according to the embodiment of the present invention.

[Electrical Configuration] Next, the electrical configuration of the ink heating device 7 provided in the ink supply device 2 will be described. FIG. 7 is a circuit diagram showing the ink heating device 7. FIG. 8 is a circuit diagram showing the heater circuit 91. FIG. 9 is a timing diagram of a detection signal.

The ink heating device 7 (see FIG. 7) includes a heater circuit 91, a relay 5 provided between the heater circuit 91 and the AC power source A, a controller 4 which controls the relay 5, and an operating part 6 to which an operation is accepted. At least one heater circuit 91 is provided for each color of the ink. In the example of FIG. 7, one heater circuit 91 is shown for each ink color (Y, Bk, C and M) for convenience, but in a case where the heaters 75 are provided in parallel for each ink color as shown in FIG. 6A, the number of heater circuits 91 is also multiple for each ink color.

The heater circuit 91 (see FIG. 8) includes the heater 75 which heats the ink, the auto-return type bimetal switch 92 provided between the heater 75 and the relay 5, a detection part 93 which outputs a detection signal indicating that a power supply to the bimetal switch 92 is detected, and a driving element 94 which drives the heater 75. The relay 5 is provided between the bimetal switch 92 and the AC power source A. The controller 4 controls the relay 5 according to the state of the detection signal output from the detection part 93.

The auto-return type bimetal switch 92 is opened when the temperature of the heater 75 is more than a threshold (for example, 75 degrees) and is closed when the temperature of the heater 75 is below the threshold.

The detection part 93 outputs a detection signal when the bimetal switch 92 is powered on, and stops the output of the detection signal when the bimetal switch 92 is not powered on. The detection signal is, for example, a zero-cross signal indicating the timing when the AC voltage becomes 0 V (see FIG. 9(*a*)).

The driving element 94 is a triac, for example, and changes a duty ratio of the voltage according to the remote signal supplied from the controller 4.

The controller 4 is an integrated circuit in which logic circuits are integrated. The controller 4 controls the temperature of the heater 75 by changing the duty ratio of the voltage output of the driving element 94 by the remote signal. The controller 4 may be a combination of the processor and software.

The controller 4 controls the relay 5 according to the state of the detection signal output from the detection part 93. Specifically, the controller 4 makes the relay 5 open when a state in which the detection signal has stopped continues for a predetermined time or longer. On the other hand, the controller 4 does not make the relay 5 open when the state in which the detection signal has stopped continues for less than the predetermined time.

In addition, the controller 4 makes the relay 5 open when the state in which the detection signal has stopped in any one of the heater circuits 91 continues for the predetermined time or longer. On the other hand, the controller 4 does not make the relay 5 open when the detection signals from all the heater circuits 91 stop together.

The detection signal stops when the bimetal switch 92 is opened when the temperature of the heater 75 reaches or exceeds a predetermined value. For example, the bimetal switch 92 is opened when the heater 75 is overheated due to a failure of the controller 4, the driving element 94 or the others. Since the failure of the controller 4 or the driving element 94 is often a permanent failure, the overheating may continue for a long time.

The detection signal may be stopped by causes other than the permanent failure. For example, if the driving element 94 is a triac, an overshoot may occur at the rise of a pulsed voltage, in such case, an instantaneous overheating may occur. Alternatively, an instantaneous overheating may occur due to a voltage drop when a large amount of power is used in the neighborhood, an inrush current during the recovery of a power flicker, a surge current during a lightning strike, or the like. Such an event also stops the detection signal by opening the bimetal switch 92.

If the power supply from the AC power source A is stopped due to a power cut or accidental unplugging of the power cord, since the heating of the heater 75 is stopped, the bimetal switch 92 does not open, but since the power supply of the bimetal switch 92 stops, the detection signal also stops.

The operating part 6 is, for example, a tactile switch, and is provided on the upper portion of the housing 65. After opening the relay 5, the controller 4 makes the relay 5 close when an operation to push the tactile switch (an example of a predetermined operation) is accepted.

Figure 10:
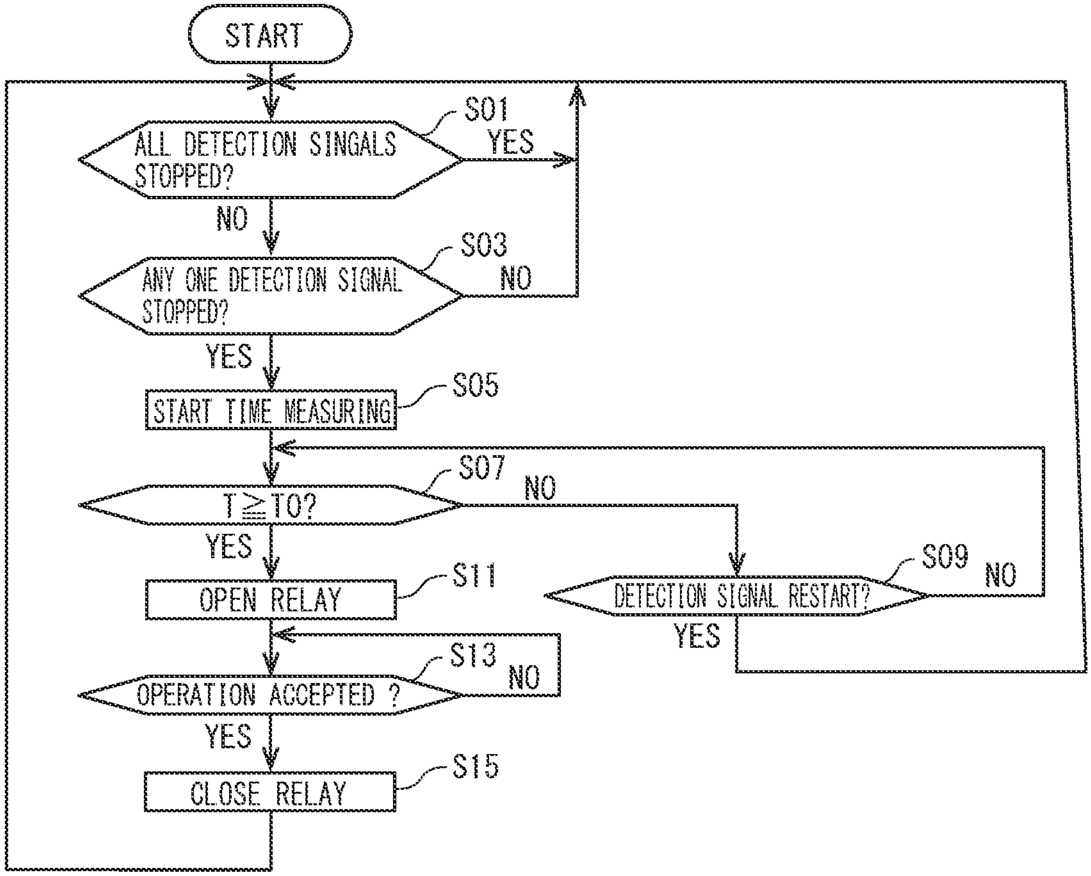
FIG. 10 is a flowchart showing an operation of the ink heating device according to the embodiment of the present invention.

[Operation of Ink Heating Device] Next, the operation of the ink heating device 7 will be described. FIG. 10 is a flow chart showing the operation of the ink heating device 7. First, the controller 4 determines whether the detection signals from all the heater circuits 91 are stopped together (step S01). When it is determined that the detection signals from all the heater circuits 91 are stopped (step S01: YES), the controller 4 repeats the processing of step S01. On the other hand, when it is determined that the detection signals from all the heater circuits 91 are not stopped together (step S01: NO), the controller 4 determines whether the detection signals from any one of the heater circuits 91 is stopped (step S03). When it is determined that the detection signal from any one of the heater circuits 91 is stopped (step S03: YES), the controller 4 starts time measuring (step S05). On the other hand, when it is determined that the detection signal from any of the heater circuits 91 is not stopped (step S03: NO), the controller 4 repeats the processing of step S01.

If the time measuring is started in step S05, the controller 4 determines whether the measured time T is equal to or greater than a predetermined time TO (step S07). As shown in FIG. 9(*c*) and FIG. 9(*d*), when the measured time T is equal to or greater than the predetermined time TO (step S07: YES), the controller 4 sends a control signal to the relay 5 to open the relay 5 (step S11). On the other hand, as shown in FIG. 9(*b*), when the time T is less than the predetermined time TO (step S07: NO), the controller 4 determines whether the output of the stopped detection signal is restarted (step S09). When the output of the stopped detection signal is restarted (step S09: YES), the controller 4 repeats the processing of step S01. On the other hand, when the output of the stopped detection signal is not restarted (step S09: NO), the controller 4 repeats the processing of step S07.

If the relay 5 is opened in step S11, the controller 4 determines whether a prescribed operation is accepted by the operating part 6 (step S13). When it is determined that the prescribed operation is accepted by the operating part 6 (step S13: YES), the controller 4 sends the control signal to the relay 5 to close the relay 5 (step S15). On the other hand, when it is determined that the prescribed operation is not accepted by the operating part 6 (step S13: NO), the controller 4 repeats the processing of step S13.

According to the ink heating device 7 of this embodiment described above, when overheating occurs, the opening of the bimetal switch 92 stops the power supply to the heater 75, so that the time from the occurrence of overheating to the stop of heating can be shortened.

In addition, according to the ink heating device 7 according to the present embodiment, since the relay 5 is opened when the state in which the detection signal has been stopped continues for a prescribed time or longer, the heating is not restarted if the bimetal switch 92 is restored when the possibility of permanent failure is high.

In addition, according to the ink heating device 7 according to the present embodiment, after opening the relay 5, the relay 5 is closed when the prescribed operation is accepted by the operating part 6, so that the heating can be restarted after a human confirms safety.

In addition, according to the ink heating device 7 according to the present embodiment, since the relay 5 is not opened when the state in which the detection signal has stopped continues for less than the predetermined time, the heating can be restarted by the return of the bimetal switch 92 when the possibility of permanent failure is low. In addition, if the threshold of the bimetal switch is increased so as not to react to the aforementioned instantaneous overheating, the bimetal switch 92 is exposed to high temperatures more frequently and the safety may be degraded, but in the present embodiment, even if the bimetal switch 92 is opened due to the instantaneous overheating, the relay 5 is not opened, so that it is not necessary to increase the threshold of the bimetal switch 92. Therefore, a decrease in safety can be avoided.

In addition, according to the ink heating device 7 according to the present embodiment, the relay 5 is opened when the state in which the detection signal has stopped in any one of the heater circuits 91 continues for predetermined time or longer, so that when the possibility of permanent failure is high, the heating is not restarted even if the bimetal switch 92 is restored.

In addition, according to the ink heating device 7 according to the present embodiment, since the relay 5 is not opened when both the detection signals from all the heater circuits 91 are stopped, the process of opening the relay 5 when the power supply from the AC power source A stops can be omitted.

The above embodiment may be modified as follows.

In the above example, the driving element 94 is a triac, but the driving element 94 may be a solid-state relay or the like.

In the above example, the detection signal is a zero-cross signal, but the detection signal may be a voltage detection signal indicating that a voltage is detected or a current detection signal indicating that a current is detected.

In the above embodiment, the relay 5 is opened when the state in which the detection signal has stopped continues for more than a predetermined time, but the relay 5 may also be opened when an event in which the state in which the detection signal has stopped continues for less than a predetermined time repeatedly occurs. With this configuration, the safety of the ink supply device 2 can be further enhanced.

In the above embodiment, an example is shown in which the operating part 6 is provided in the housing 65 of the ink supply device 2, but it may be configured to perform a prescribed operation using the operation panel of the printer 1. With this configuration, the operation of restarting the heating of the ink becomes easy.

The invention claimed is:

1. An ink heating device comprising:

a heater circuit including a heater which heats ink and a single auto-return type bimetal switch which is provided between the heater and an AC power source;

a detection part which outputs a detection signal indicating that a power supply to the bimetal switch is detected;

a relay provided between the bimetal switch and the AC power source; and a controller which opens or closes the relay according to a state of the heater circuit, wherein the detection signal is a zero-cross signal indicating a timing when the AC voltage becomes 0 V, and the controller makes the relay open when a state where the detection signal has stopped continues for a predetermined time or longer.

2. The ink heating device according to claim 1, further comprising an operating part which accepts operation, wherein the controller makes the relay open and then close when a predetermined operation is accepted by the operating part.

3. The ink heating device according to claim 1, wherein the controller does not make the relay open when the state where the detection signal has stopped continues for less than the predetermined time.

4. The ink heating device according to claim 1, wherein the heater circuit contains a plurality of the heater circuits, and the controller makes the relay open when a state where the detection signal has stopped in any one of the heater circuits continues for the predetermined time or longer.

5. The ink heating device according to claim 4, wherein the controller does not make the relay open when the detection signals from all the heater circuits have stopped.

6. The ink heating device according to claim 1, wherein the bimetal switch is closed and switched to a power-on state when a temperature of the heater is below a threshold, and is opened and switched to a power-off state when the temperature of the heater is above the threshold.

7. An ink supply device comprising:

an ink container for storing the ink, and the ink heating device according to claim 1, which heats the ink supplied from the ink container.

8. An image forming system comprising:

the ink supply device according to claim 7, and an inkjet recording device including a conveyance unit which conveys a sheet-like recording medium and an inkjet head which ejects the ink supplied from the ink supply device to the recording medium conveyed by the conveyance unit.

* * * * *